March 29, 1960 R. C. HERGENROTHER 2,930,926

TRAVELING WAVE TUBES

Filed Nov. 16, 1956 2 Sheets-Sheet 1

INVENTOR
RUDOLF C. HERGENROTHER
BY Elmer J. Gorn
ATTORNEY

TRAVELING WAVE TUBES

Filed Nov. 16, 1956 2 Sheets-Sheet 2

INVENTOR
RUDOLF C. HERGENROTHER
BY Elmer J. Gorn
ATTORNEY

United States Patent Office 2,930,926

Patented Mar. 29, 1960

2,930,926

TRAVELING WAVE TUBES

Rudolf C. Hergenrother, West Newton, Mass., assignor to Raytheon Company, a corporation of Delaware

Application November 16, 1956, Serial No. 622,614

7 Claims. (Cl. 315—3.5)

This invention relates to traveling wave tubes of improved construction and more particularly to resistive terminations for delay networks used in such tubes.

When periodic slow wave propagating networks are used in traveling wave oscillators of the backward wave type, it is essential that the network be terminated at or near one end in order to prevent substantial reflection of the wave energy from that end of the network toward the output end of the network. In the case of a tube using a localized cathode, the end of the network to be terminated is the end opposite the electron gun. This termination should have a relatively low reflection coefficient over the entire tuning band in order to avoid variations of output energy with frequency.

One method of producing this termination is to extend the delay network for a considerable distance beyond its active portion and to coat this extended (inactive) portion with a resistive film, usually a material having high magnetic permeability. This method requires a tube of increased size, length and weight, since the coated portion of the line is inactive for producing the interaction between the electron beam and the electromagnetic wave traversing the network. Moreover, the coating of the periodic elements of the network often poses practical problems in achieving uniformity of coating, particularly where suitable impedance matching is required.

In accordance with the invention, the network is terminated in a uniform resistive layer which is thin in comparison with the depth of current penetration over the desired operating frequency range, said layer having a surface resistivity of 377 ohms per square and a resistance measured between the contacts to the delay network equal to the characteristic resistance of the line. This may be achieved by means of a resistive terminating element comprising a small electrically insulating body having one of the surfaces, or two opposed surfaces, covered with a thin resistive film, and securing this terminating element to appropriate portions of the network. The terminating element is so shaped that it will be retained in the delay network and may be inserted during brazing.

The resistive terminating element is positioned within the periodic delay network so as to be substantially coextensive with the electric field along the delay network. The resistive terminating element is substantially parallel to the electric field lines and is of substantially uniform resistivity.

If the network is an interdigital structure comprising two sets of spaced and interleaved fingers extending from a base portion toward the base portion of the opposite set, the terminating element may be positioned either between the end of the last finger and the base portion, or between the last finger and the next to last finger in the region of the end of the last finger. In the case of a helical delay network, the terminating element preferably is positioned between two adjacent turns of the helix.

In the broadest sense, the invention does not require an electrically insulating body for mounting the resistive layer. Where delay network dimensions and strength requirements permit, an unmounted thin resistive layer may be positioned in the region of the electric field along the delay network. Owing to the fact that the resistive layer should be no thicker than the depth of current penetration over the desired frequency range in order to avoid change in effective resistance because of the well-known skin effect as frequency of operation changes, it is usually necessary, for reasons of mechanical strength, to mount the resistive layer on a supporting body.

For a better understanding of the invention, together with further objects thereof, reference is made to the following description taken in conjunction with the accompanying drawing wherein.

Figures 1, 2:
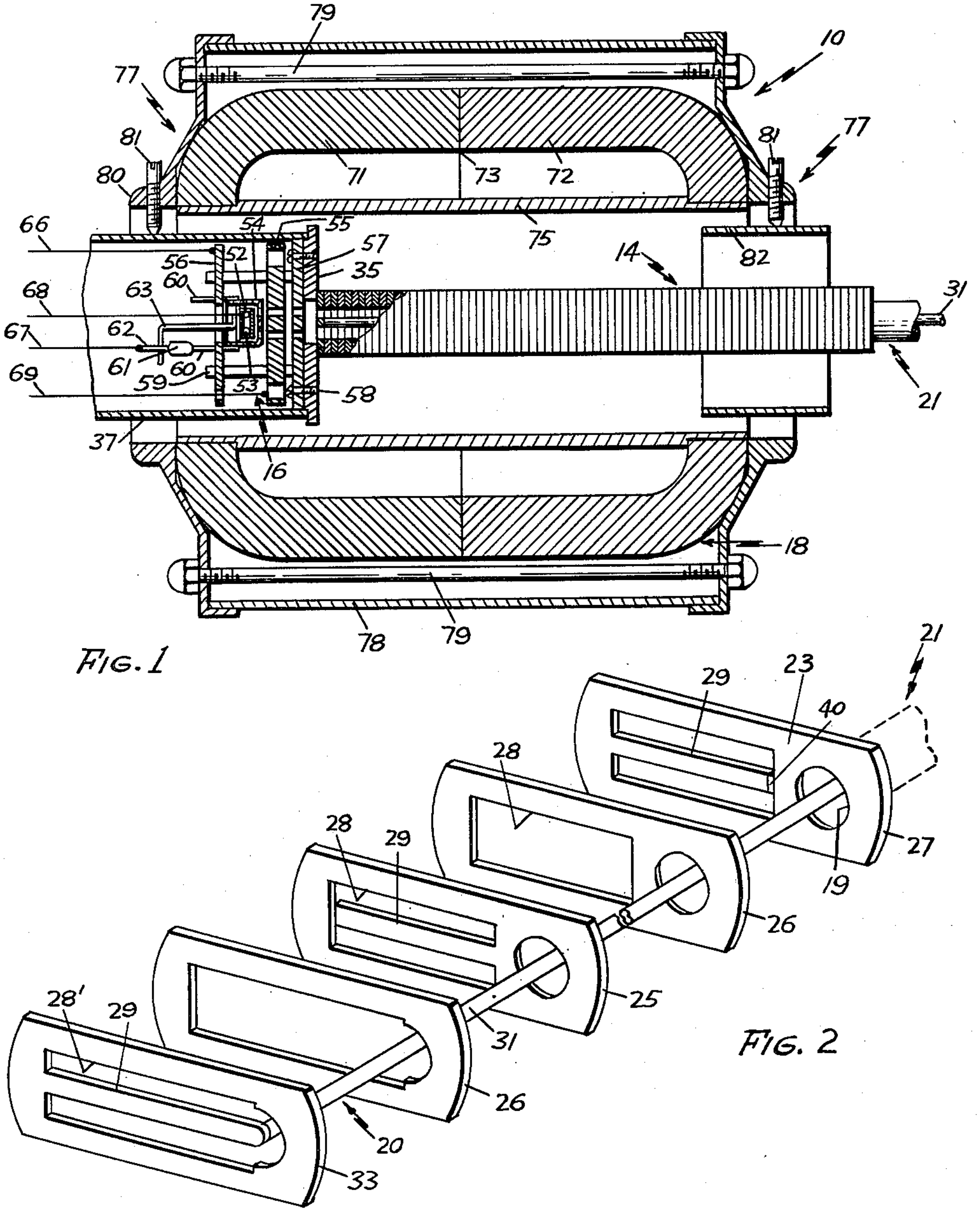
Fig. 1 is a cross-sectional view of a traveling wave oscillator of the backward wave type.
Fig. 2 is an exploded view showing the relative position of the laminations comprising the periodic delay network of the device of Fig. 1.

Referring now to Figs. 1 and 2, a traveling wave oscillator 10 is shown which comprises generally an anode assembly including a periodic interdigital slow wave propagating network 14, sometimes referred to as a delay network, an electron gun assembly 16, a magnet assembly 18, and output coupling means 20, 21, which comprises a portion 20 located inside the delay network 14 and a portion 21 connected outside said delay network.

The anode delay network 14 comprises a series of laminations, the major portions of which are arranged in sets of four, as indicated in Fig. 2. Each lamination contains a circular aperture 19 near one end whose boundary serves as a portion of the outer conductor of the portion 20 of the coaxial output coupling means. In other words, the periphery of the circular apertures 19 in the assembly of laminations forms a continuous outer conductor of diameter equal to the diameter of these apertures. The laminations 25 and 27, together with spacer laminations 26, of each set are further provided with rectangular openings 28. Lamination 25 includes an elongated electrically conductive element or finger 29 which extends from one edge of opening 28 almost to the opposite edge thereof. Lamination 27 likewise includes an electrically conductive finger 29, which extends from the edge of the opening 28 opposite that of lamination 25 to a point adjacent, but not contacting, the opposite edge of said opening. The elements 29 of laminations 25, when assembled, are positioned in spaced relationship with adjacent elements 29 of lamination 27. Proper spacing between successive fingers or elements of the anode network is achieved by means of the spacer laminations 26 which do not contain any fingers. The inner conductor 31 of the coaxial coupling means is attached at one end to an end lamination 33, which is similar to lamination 27, except that the finger 29 thereof is slightly longer in order to permit connection to be made directly to the inner conductor 31; the opening 28' in lamination 33, unlike the openings 28 of the other laminations, is continuous with the circular opening forming the boundary of the outer conductor of the coaxial line. The various laminations may be joined together, as by brazing, to form a united periodic interdigital network 14. The end lamination 33 may be secured, as by brazing, to a disc 35, which is attached, in turn, to a cylinder 37 within which the electron gun assembly 16 is mounted.

The end lamination 27, that is, the lamination farthest from the electron gun, is provided with a terminating resistive element 40. The composition of element 40 and the method of attachment to the delay network 14 are shown in detail in Figs. 4 to 7 and will be described subsequently.

Figure 3:
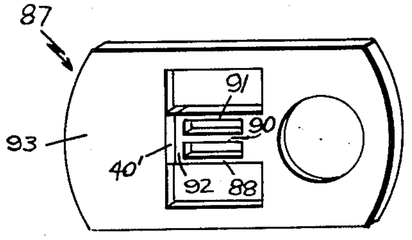
Fig. 3 is a view showing a second type of lamination suitable for use in traveling wave tubes where more than one periodic delay network is connected in parallel.

A further type of lamination is shown in Fig. 3 and will be referred to in considerable detail after completion of the description of the device of Figs. 1 and 2.

The electron gun assembly includes a cathode 52 including a heater coil 53, a grid 54, an accelerating anode 55, and mounting plates 56 and 57. The elements 55 to 57 of the electron gun are insulatedly mounted in spaced relationship by means of ceramic support rods 59 which pass through elements 55 to 57; a ceramic-to-metal braze may be made at the points of insertion of the support rods 59 into the accelerating anode 55 and the mounting plates 56 and 57. The grid 54 is supported from mounting plate 56 by means of one or more rods 60 spot-welded to the grid and extending through mounting plate 56. A glass bead 61 is attached to one end of one of the rods 60, while a wire 62 is secured to glass bead 61, as shown in Fig. 1. The cathode 52 is supported from mounting plate 56 by means of a rod 63 spot-welded to the cathode and passing through a central aperture in mounting plate 56; the support rod 63 for the cathode is attached to wire 62. A grid lead 66 is secured to mounting plate 56 and a cathode lead 67 is connected to the wire 62. A heater lead 68 is connected to one end of the heater coil 53 and the other end of the heater may be connected directly to the cathode. The accelerating anode 55 is mounted on support rods 59 in spaced relationship with the grid 54 and a lead 69 is attached to the accelerating anode. The mounting plate 57 is attached directly to the disc 35 at the end of cylinder 37 by means of screws 58. The cylinder 37 is maintained at the same potential as the periodic anode network 14 and an appropriate source of high voltage, not shown, is connected between the anode network and the cathode. Likewise, appropriate sources of potential for the other elements of the electron gun, not shown, are necessarily provided. The leads 66 to 69 extend through a seal, not shown, mounted at the end of cylinder 37 remote from disc 35. The grid, accelerating anode, and mounting plate 57 contain two aligned slots through which electrons from the cathode may pass. By means of these slots, and by means of an appropriate accelerating voltage between the accelerating anode 55 and the cathode 53, a pair of flat or ribbon-shaped beams are directed into the interaction space of the anode delay network 14, said interaction space being made up of those portions of the two spaces between the fingers 29 of each lamination and the long edges of the rectangular openings 28 which are adjacent to the fingers.

The magnet assembly 18 includes a pair of toroidal members 71 and 72 which are adapted to fit together along junction 73. Each of these members is supported at one end by a sleeve 75. A ring-plate assembly 77 is positioned at each end of the magnet assembly, and includes a first portion conforming generally to the surface of the respective magnet member, and a bracket portion extending radially outward from the first portion. An outer sleeve 78 is positioned between the opposite ring-plate assemblies. The two halves of the magnet assembly are held together by means of through bolts 79 passing through holes in the bracket portions of the assembly 77. Each ring-plate assembly 77 includes a ring portion 80 through which set screws 81 pass. The set screws in the ring portion of one-ring plate assembly are adapted to seat against the cylinder 37 surrounding the electron gun assembly 16, while the set screws in the ring portion of the other ring-plate assembly seat against a tubular member 82, against whose inner periphery rest the curved ends of a portion of the laminations of the anode delay network 14. The magnet assembly 18 provides an axial or longitudinal magnetic field for focusing the electron beam traveling along the length of the anode delay network 14.

In Fig. 3, a lamination 87, corresponding to end lamination 27 of Fig. 2, is shown for use in a parallel interdigital delay network. In this arrangement, the periodic slow wave propagating network consists of three separate interdigital networks connected in parallel and the lamination 87 consists of three fingers 88, 90, and 91. The electrons, from a electron source, not shown, are directed along a plurality of ribbon-shaped beams in the interaction spaces between the fingers of the networks. A more detailed description of this parallel delay network and the electron beam is shown in a co-pending application of R. C. Hergenrother, Ser. No. 579,972, filed April 23, 1956. The lamination shown in Fig. 3 includes a bridging element 92 for electrically interconnecting the ends of each of the fingers of the lamination. This bridging element, which reduces the tendency of the traveling wave tube to present discontinuities in the frequency band of operation, may be eliminated in some applications. As in the case of the delay network 14 of Figs. 1 and 2, the fingers of adjacent laminations 87 are oppositely directed, and spacer laminations, not shown, are inserted between the adjacent laminations.

A terminating resistive element 40' is inserted between the bridging element 92 and the base 93 of the lamination 87. The composition of element 40' of Fig. 3, and the method of insertion of element 40' of Fig. 3 in the delay network are the same as in the device shown in Figs. 1 and 2, and will now be described.

Figure 4:
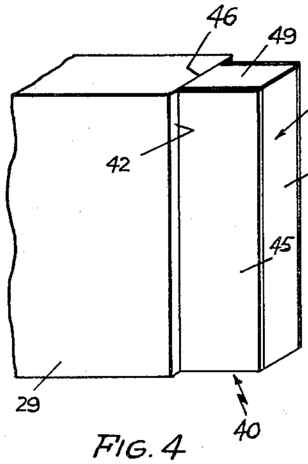
Fig. 4 to 6 are fragmentary views illustrating the details of construction of the impedance terminating element and the manner of connection of this element to the periodic delay network.
Figure 6:
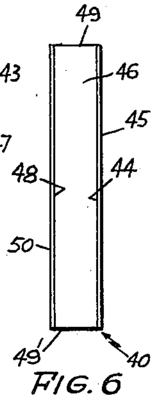
Figure 5:
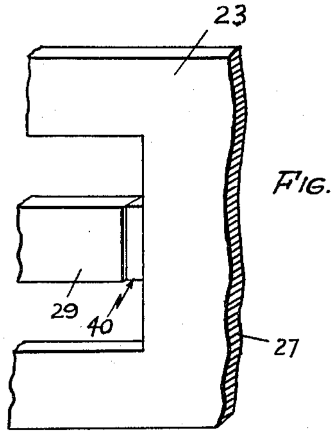

As shown in Figs. 4 to 6, resistive-terminating element 40 may be inserted in the region between the tip or end face 42 of finger 29 and the base portion 23 of lamination 27.

Element 40 may consist essentially of an electrically insulating block 43 coated on opposed surfaces 44 and 48 with thin resistive layers 45 and 50, such as carbon, and having surfaces 46 and 47 plated with an electrically conductive material. In one form, the block 43 is made of metallized ceramic, and the surfaces 46 and 47 are plated first with rhodium and then with copper. The surfaces 44 and 48 of the ceramic block are then carbonized by any of several well-known carbonizing techniques, such as coating with sugar and exposing the coated block to hydrogen atmosphere. After coating, the carbon is readily removable from the metallized surfaces, leaving surfaces 44 and 48 coated with respective thin layers 45 and 50 of carbon. The invention is not limited to a carbonaceous layer; any resistive material is within the scope of the invention.

The resistance of the carbon films or layers 45 and 50 is tested prior to insertion of terminating element 40 into the delay network. The resistance of the film, which is measured between two electrical conductors placed in contact with the surfaces 46 and 47, should be substantially equal to the characteristic impedance of the delay network and is partially dependent upon the thickness of the resistive layer or layers; that is, upon the thickness of deposit of the carbon. By scraping off a portion of the carbon film, the resistance is increased, while the resistance may be reduced by additional carbonization. A resistance of 114 ohms has been found suitable in one traveling wave device incorporating the invention; however, the resistance will depend upon the characteristics of the delay network and the tube in which the network is included. A surface resistivity of 377 ohms per square is proper. The thickness of the resistive layer or layers should be less than the depth of current penetration at the highest desired operating frequency in the frequency operating range. The depth of current penetration, or skin depth $\delta$ at which the current density is $$\frac{1}{e}$$

of its value at the surface, is given by the equation $$\delta=\sqrt{\frac{\rho}{k\mu f}}$$

where $\rho$ is the resistivity of the material, $\mu$ is the permeability, $f$ is the frequency, and $k$ is a constant. The longer pair of opposed plated surfaces 46 and 47 of the block 43 is secured, as by brazing, to the tip 42 of end finger 29, and the base portion 23, respectively, of lamination 27 of the delay network 14. The terminating element 40 may be positioned between the silver plated surfaces of the delay network and heat then applied so as to braze the block 43 in position between the portions of the delay network. The traveling wave traverses an undulating path in the spaces between adjacent fingers and in the space between the tip of a finger 29 and the base portion 23 of the network 14. The carbonized surfaces 45 and 50 of the terminating element 40 are positioned in the space occupied by the electric field existing along the delay network 14, and provides an effective, substantially reflectionless termination for the end of the delay network 14 remote from the electron gun. The carbonized surface or layer 45 should be of uniform resistivity in order to provide a suitable impedance termination over a broad frequency band. The thickness of the ceramic block 43 in the direction of wave propagation preferably should be as small as possible since the ceramic has a large dielectric constant compared with that of free space. Likewise, the thickness of the resistive layer or layers must be small in relation to the depth of penetration (dependent upon frequency), over the desired operating frequency range to prevent changes in effective resistance with frequency owing to the well-known skin effect.

It should be noted that, while both opposed surfaces 44 and 48 of the terminating element 40 are carbonized, as shown in Fig. 6, in which case, the resistance corresponds to that of the two resistive layers 45 and 50 in parallel, a single surface only may be carbonized, provided, of course, that the resistance of the resistive layer is correspondingly changed.

Figure 7:
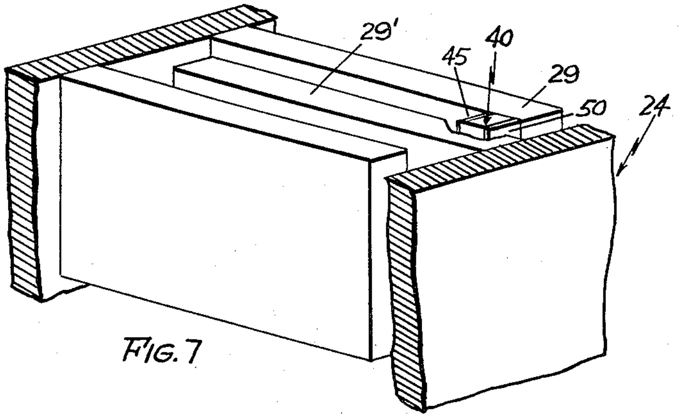
Fig. 7 is a view showing a portion of a periodic delay network and illustrating a second arrangement for positioning the terminating element in the periodic delay network.

A further arrangement for the terminating element 40 is shown in Fig. 7 where the terminating element 40 is inserted between end finger 29 and the adjacent finger 29′ of delay network 14. As in the case of the disposition of Figs. 4 and 5, the element 40 of Fig. 7 may have a resistive layer on one or both of the opposed surfaces 44 and 46.

The opposed resistive layers 50 and 45 (only one of which is visible in Fig. 7) are metalized in the same manner as described in connection with Figs. 4 to 6 and the terminating element 40 is brazed to the fingers 29 and 29′ by the method previously described. Block 43 of Fig. 7, like that of Figs. 4 to 6, may have a resistive layer 45 on only one surface, rather than on two opposed surfaces.

It should be noted that the method of attaching the terminating element shown in Figs. 4 and 5 may be used with a solid interdigital structure, such as shown in Fig. 7; conversely, the method of attachment indicated in Fig. 7 may be employed in the laminated structure of Figs. 4 and 5; likewise, the terminating element 40′ of Fig. 3 may be incorporated into either a laminated or solid slow wave propagating structure, while the terminating element 40′ of Fig. 3 may be inserted between adjacent fingers, in the manner indicated in Fig. 7.

Figures 8, 9:
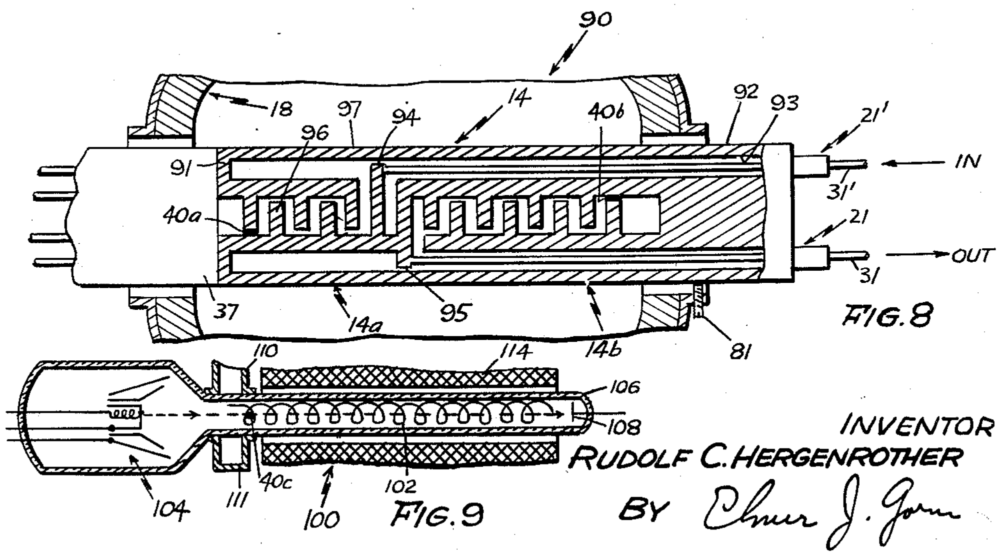
Fig. 8 is a view, largely in section, of a traveling wave amplifier using a laminated slow wave propagating network and an impedance terminating element.
Fig. 9 illustrates a traveling wave tube using a helical delay network instead of the interdigital tube of Figs. 1 and 2.

In Fig. 8, a backward wave traveling wave amplifier 90 is shown whose anode assembly or delay structure 14 includes two separate delay networks **14*a* and 14*b*, each similar to that previously described. The basic principles of this type of amplifier, wherein a laminated construction is used, is pointed out in detail in the aforesaid copending application. As shown in Fig. 8, the delay structure 14 is indicated as being of solid construction. It should be understood, of course, that either type of construction may be used interchangeably. The tube of Fig. 8 includes an electron gun assembly, not shown, mounted within cylinder 37**. This electron gun assembly may be similar to that shown in the device of Fig. 1. The transverse configuration of the anode delay networks is similar to that indicated in Fig. 2, with the electron beam passing adjacent the edges of the various fingers. Attention again is directed to the aforementioned copending application for a more detailed description of the electron gun and the electron beam paths.

The anode delay network **14*a* includes an end portion 91 which may be affixed to the end of cylinder 37. The amplifier 90 of Fig. 8 includes a magnet assembly 18 fixedly mounted relative to the anode assembly in the same manner as shown in the device of Fig. 1. The set screws 81 in ring-plate assembly 77 in the right-hand end of the tube rest against the delay network 14*b* directly, rather than against a cylindrical member 82, as in Fig. 1; however, either method of support may be used. The separate delay networks 14*a* and 14*b* are coupled only by the electron beam which passes adjacent both networks in a direction from left to right at Fig. 8. The end portion 92 at the end of the anode assembly remote from the electron gun serves as an electron collecting electrode. The input connection to the tube for supplying a radio frequency input signal to the amplifier includes a coaxial line 21′ whose inner conductor 31′ passes through an aperture 93 in delay structure 14 and connects to the end finger 94 of network 14*a*; this finger is of greater length than the remaining fingers 96 of network 14*a* in order to permit ready connection to the inner conductor 31′ of the coaxial input line. Finger 94 is located at the downstream end of the first delay network 14*a*, that is, at the end thereof toward which electrons are being directed. In the backward wave amplifier, shown in Fig. 8, interaction between the electron beam and the backward wave traveling along network 14*a* modulates the electron beam, which beam continues on past the second delay network 14*b*. The amplified output signal is taken from delay network 14*b* at the beam-entering or upstream end thereof by means of an output coupling device 21, consisting of a coaxial line, whose inner conductor 31 passes through a circular aperture 34 in delay structure 14 and connects to elongated finger 95 of delay network 14*b***.

The upstream end of the first anode network **14*a* and the downstream end of the last anode network 14*b* is properly terminated by terminating elements 40*a* and 40*b*, respectively, in order to avoid reflection of energy. Such terminating elements are similar to those shown in Figs. 1 to 6 and may be positioned between the ends of the respective end fingers of the delay networks 14*a* and 14*b* and the base portion 97 of the anode assembly 14**. Alternatively, the terminating elements may be inserted between adjacent fingers of the anode assembly, in a manner such as shown in Fig. 7.

It should be noted that the form of delay networks shown in Fig. 8 is merely illustrative; for example, more than one network may be connected in parallel, such as shown in Fig. 3.

Although the devices so far described include an interdigital delay network, it should be understood that the invention also is applicable to traveling wave tubes wherein an electron beam passes adjacent a helical delay line.

Such a tube is shown schematically in Fig. 9 by the reference numeral 100, and includes, in addition to a helical delay network 102, an electron gun 104 positioned at one end of an evacuated envelope 106, and a collector electrode 108 at the downstream end of the tube. The electron beam produced by the electron gun is caused to travel in a path, indicated by the dashed lines, adjacent the helix 102, so that interaction between the electron stream and wave energy traveling along helix 102 in a direction opposite to that of the electron beam causes energy to be transferred to the helix. This energy may be extracted from the helix by means including a wave guide 110 having a shorted termination 111. Tube 100 further includes a longitudinal (axial) magnetic field-producing means, such as a coil 114, positioned about the tube envelope 106 for focusing the beam as it travels along the length of the tube. The tube described in Fig. 9 may be similar to that shown and described in detail in an application for United States patent, Serial No. 566,940, of Edward C. Dench, filed February 21, 1956, now United States Letters Patent No. 2,922,956, issued January 26, 1960.

Figure 10:
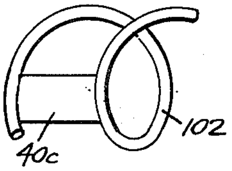
Fig. 10 illustrates a portion of the helical delay network of Fig. 9 with an impedance terminating element secured thereto.

The majority of the electric lines of force are disposed between adjacent turns of the helix. The resistive terminating element **40*c* is inserted between the last two turns of helix 102 at the electron gun end of the tube, as shown more clearly in Fig. 10, and is thus positioned in the region of the electric field. Either or both concave surfaces of terminating element 40*c*, like the surfaces 44 and 48 of terminating element 40** of Figs. 4 and 6 are covered with a thin resistive film or layer.

This invention is not limited to the particular details of construction, materials and processes described, as many equivalents will suggest themselves to those skilled in the art. For example, the principles of this invention are equally applicable to a traveling wave tube using crossed electric and magnetic fields, such as the tube shown in Fig. 1 of the aforesaid Dench application. It is accordingly desired that the appended claims be given a broad interpretation commensurate with the scope of the invention within the art.

What is claimed is:

1. In combination, a periodic slow wave energy-propagating structure constructed to produce along a path adjacent thereto fields of electromagnetic wave energy being transmitted, said structure including two interdigital assemblies each having a common portion from which extend a plurality of fingers, and an impedance terminating means having portions contacting said slow wave structure, said means comprising a resistive layer whose thickness is small in comparison with the depth of current penetration over the operating frequency range, said layer being disposed substantially parallel to the electric field adjacent one end of said propagating structure, said means being disposed in contact with one end of a finger of one of said assemblies, said layer being of substantially uniform surface resistivity of the order of 377 ohms per square, the resistance between the portions of said means contacting said slow wave structure being substantially equal to the characteristic impedance of said structure.

2. In combination, a periodic slow wave energy-propagating structure constructed to produce along a path adjacent thereto fields of electromagnetic wave energy being transmitted, said structure including two interdigital assemblies each having a common portion from which extend a plurality of fingers, an impedance terminating member including an electrically insulating element having at least one of two opposed surfaces covered with a resistive layer whose thickness is small in comparison with the depth of current penetration over the operating frequency range, said layer being disposed substantially parallel to the electric field adjacent one end of said propagating structure, said member being disposed in contact with one end of a finger of one of said assemblies and with said common portion of the other assembly, said layer being of substantially uniform surface resistivity of the order of 377 ohms per square.

3. In combination, a periodic slow wave energy-propagating structure constructed to produce along a path adjacent thereto fields of electromagnetic wave energy being transmitted, said structure including two interdigital assemblies each having a common portion from which extend a plurality of fingers, and an impedance terminating member comprising a resistive layer whose thickness is small in comparison with the depth of current penetration over the operating frequency range, said layer being disposed substantially parallel to the electric field adjacent one end of said propagating structure, said member being disposed in a region between one end of one of said fingers and the finger adjacent thereto, said layer being of substantially uniform surface resistivity of the order of 377 ohms per square.

4. In combination, a periodic slow wave energy-propagating structure constructed to produce along a path adjacent thereto fields of electromagnetic wave energy being transmitted, said structure including two interdigital assemblies each having a common portion from which extend a plurality of fingers, and an impedance terminating member including an electrically insulating element having at least one of two opposed surfaces covered with a resistive layer whose thickness is small in comparison with the depth of current penetration over the operating frequency range, said layer being disposed substantially parallel to the electric field adjacent one end of said propagating structure, said member being disposed in a region adjacent one end of one of said fingers and the finger adjacent thereto and in contact with these fingers, said layer being of substantially uniform surface resistivity of the order of 377 ohms per square.

5. In combination, a periodic slow wave energy-propagating structure constructed to produce along a path adjacent thereto fields of electromagnetic wave energy being transmitted, said structure including two interdigital assemblies each having a common portion from which extend a plurality of fingers, and an impedance terminating means having portions contacting said slow wave structure, said means comprising a resistive layer whose thickness is small in comparison with the depth of current penetration over the operating frequency range, said layer being disposed substantially parallel to the electric field adjacent one end of said propagating structure, said means being disposed in contact with one end of a finger of one of said assemblies, said layer being of substantially uniform surface resistivity of the order or 377 ohms per square.

6. In combination, a periodic slow wave energy-propagating structure constructed to produce along a path adjacent thereto fields of electromagnetic wave energy being transmitted, said structure including two interdigital assemblies each having a common portion from which extend a plurality of fingers, and an impedance terminating means having portions contacting a finger adjacent one end of said slow wave structure and adjacent one end of said finger, said means comprising a resistive layer whose thickness is small in comparison with the depth of current penetration over the operating frequency range, said layer being disposed substantially parallel to the electric field adjacent one end of said propagating structure, said layer being of substantially uniform surface resistivity of the order of 377 ohms per square.

7. In combination, a periodic slow wave energy-propagating structure constructed to produce along a path adjacent thereto fields of electromagnetic wave energy being transmitted, said structure including two interdigital assemblies each having a common portion from which etxend a plurality of fingers, and an impedance terminating member comprising a resistive layer whose thickness is small in comparison with the depth of currrent penetration over the operating frequency range, said layer being disposed substantially parallel to the electric field adjacent one end of said propagating structure, said member being disposed in contact with one end of a finger of one of said assemblies and with said common portion of the other assembly, said layer being of substantially uniform surface resistivity of the order of 377 ohms per square.

References Cited in the file of this patent

UNITED STATES PATENTS

| | | |
|---|---|---|
| 2,602,148 | Pierce | July 1, 1952 |
| 2,637,001 | Pierce | Apr. 28, 1953 |
| 2,771,565 | Bryant et al. | Nov. 20, 1956 |
| 2,800,604 | Beaver | July 23, 1957 |
| 2,801,361 | Pierce | July 30, 1957 |
| 2,810,854 | Cutler | Oct. 22, 1957 |
| 2,811,664 | Kazan | Oct. 29, 1957 |
| 2,823,335 | Dench et al. | Feb. 11, 1958 |
| 2,843,797 | Boyd | July 15, 1958 |

FOREIGN PATENTS

| | | |
|---|---|---|
| 1,092,775 | France | Nov. 10, 1954 |